(12) United States Patent
Yatsu et al.

(10) Patent No.: US 7,712,911 B2
(45) Date of Patent: May 11, 2010

(54) IMAGE DISPLAY DEVICE AND LIGHT DIFFUSION COMPONENT FOR USE THEREIN

(75) Inventors: Masahiko Yatsu, Fujisawa (JP); Koji Hirata, Yokohama (JP); Kei Adachi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 11/747,413

(22) Filed: May 11, 2007

(65) Prior Publication Data

US 2008/0089094 A1 Apr. 17, 2008

(51) Int. Cl.
G09G 3/28 (2006.01)

(52) U.S. Cl. ............... 362/97.1; 362/97.2; 362/97.3; 362/294; 345/60

(58) Field of Classification Search ....... 362/97.1–97.4, 362/217.03, 217.04, 311.01, 354, 355, 615–628, 362/555, 559, 299, 294; 349/64; 359/341.3; 345/60

See application file for complete search history.

(56) References Cited

U.S. PATENT DOCUMENTS

| | | | | |
|---|---|---|---|---|
| 4,621,898 A * | 11/1986 | Cohen | ........................ | 359/601 |
| 5,877,829 A * | 3/1999 | Okamoto et al. | ............... | 349/74 |
| 5,971,566 A * | 10/1999 | Tani et al. | .................... | 362/294 |
| 6,297,903 B1 * | 10/2001 | Grubb et al. | ............. | 359/341.3 |
| 6,398,370 B1 * | 6/2002 | Chiu et al. | ................... | 359/613 |
| 6,473,220 B1 * | 10/2002 | Clikeman et al. | ............ | 359/247 |
| 7,050,227 B2 * | 5/2006 | Olofson et al. | .............. | 359/443 |
| 7,327,413 B2 * | 2/2008 | Hwang et al. | ................. | 349/58 |
| 7,423,378 B2 * | 9/2008 | Park et al. | ..................... | 313/586 |
| 7,605,778 B2 * | 10/2009 | Akiba | .......................... | 345/60 |
| 2004/0095296 A1 * | 5/2004 | Kojima et al. | ................. | 345/60 |
| 2006/0145578 A1 | 7/2006 | Park et al. | | |
| 2006/0245060 A1 | 11/2006 | Goto | | |

FOREIGN PATENT DOCUMENTS

| | | |
|---|---|---|
| CN | 1800884 | 7/2006 |
| JP | 2005-338270 | 12/2005 |
| JP | 2006-189867 | 7/2006 |

* cited by examiner

*Primary Examiner*—Sandra L O'Shea
*Assistant Examiner*—Danielle Allen
(74) *Attorney, Agent, or Firm*—Antonelli, Terry, Stout & Kraus, LLP.

(57) ABSTRACT

The light diffusion component in accordance with the present invention includes light transmission pieces that are juxtaposed at predetermined intervals in one direction and have a substantially trapezoidal section, and a light absorption piece that is juxtaposed alternately to the light transmission pieces and has a substantially wedged section. The upper base of the substantially trapezoidal section of each light transmission piece adjoins the base of the substantially wedged section of the light absorption piece. The area of the substantially wedged section of the light absorption piece is equal to or larger than one-third of the area of a trapezoid bordering the substantially wedged section, and equal to or smaller than two-thirds thereof.

8 Claims, 12 Drawing Sheets

REFERENCE (f=10mm)

(f=12mm)

SUPERPOSITION

SUMMATION

10mm+12mm

10mm+15mm

10mm+18mm

10mm+20mm

REFERENCE (f=10mm)

(f=12mm)

SUPERPOSITION

SUMMATION

10mm+12mm

10mm+15mm

10mm+18mm

10mm+20mm

IMAGE DISPLAY DEVICE AND LIGHT DIFFUSION COMPONENT FOR USE THEREIN

CLAIM OF PRIORITY

The present application claims priority from Japanese Application JP 2006-278238 filed on Oct. 12, 2006, the content of which is hereby incorporated by reference into this application.

BACKGROUND OF THE INVENTION (1) Field of the Invention

The present invention relates to a technology for improving a contrast offered by an image display device that employs a display panel such as a liquid crystal display (LCD) or a plasma display panel (PDP), and alleviating moiré occurring therein.

(2) Description of the Related Art

Image display devices employing a display panel such as an LCD or a PDP are widely prevailing as a display device to be included in a television. Since the television is simultaneously viewed by multiple viewers, it is requested to offer a sufficiently wide viewing angle. Furthermore, since the television is often viewed under a bright environment, it is requested to suppress the degradation in a contrast caused by convergence of outside environmental light (for example, room lighting) on the display panel (in other words, it is requested to improve a contrast to be ensured in a bright room).

Technologies for improving a contrast to be ensured in a bright room despite convergence of outside environmental light have been disclosed in, for example, Japanese Patent Application Laid-Open Publication Nos. 2005-338270 and 2006-189867.

Japanese Patent Application Laid-Open Publication No. 2005-338270 has disclosed an idea that: outside environmental light is intercepted by an array of trapezoidal lenses and wedged pieces providing an effect of light absorption; and the refractive indices of the lenses and wedged pieces respectively are controlled in order to fully reflect part of a light beam.

Japanese Patent Application Laid-Open Publication No. 2006-189867 has disclosed an idea that: outside environmental light is intercepted by a substrate made of a transparent resin material and an array of wedged black stripes; and the refractive indices of the substrate made of a transparent resin material and the wedged black stripes respectively are controlled in order to fully reflect part of a light beam.

SUMMARY OF THE INVENTION

An array of light transmission pieces and light absorption pieces similar to the ones disclosed in Japanese Patent Application Laid-Open Publication Nos. 2005-338270 and 2006-189867 is effective in suppressing convergence of outside environmental light. However, there is a possibility that the array may cause moiré. For example, outside environmental light reflected from a display panel and light fully reflected from the wedged pieces may interfere with each other to cause moiré, and the moiré may be superposed on a display image and discerned as noise.

The present invention provides a technology for minimizing moiré while offering a wide viewing angle and ensuring an excellent contrast in a bright room.

A display device in accordance with the present invention has a light diffusion component disposed on the display surface thereof. The light diffusion component includes multiple light transmission pieces each having a substantially trapezoidal section in a predetermined direction, and light absorption pieces each having a substantially wedged section. The upper base of the substantially trapezoidal section of each light transmission piece adjoins the base of the substantially wedged section of each light absorption piece. When the light diffusion component is cut in a first direction, the area of the substantially wedged section of the light absorption member in a first direction is equal to or larger than one-third of the area of the trapezoid bordering the substantially wedged section, and is equal to or smaller than two-thirds thereof.

According to the present invention, assuming that B denotes the length of the base of the substantially wedged section of each light absorption piece and W denotes the length of the upper base of the trapezoidal section of each light transmission piece, an aperture ratio provided as W/(W+B) is equal to or larger than 10% and equal to smaller than 40%.

According to the present invention, while a wide viewing angle is offered and an excellent contrast is ensured, occurrence of moiré can be minimized.

BRIEF DESCRIPTION OF THE DRAWINGS

These and other features, objects and advantages of the present invention will become more apparent from the following description when taken in conjunction with the accompanying drawings wherein.

DESCRIPTION OF THE PREFERRED EMBODIMENTS

Figure 1:
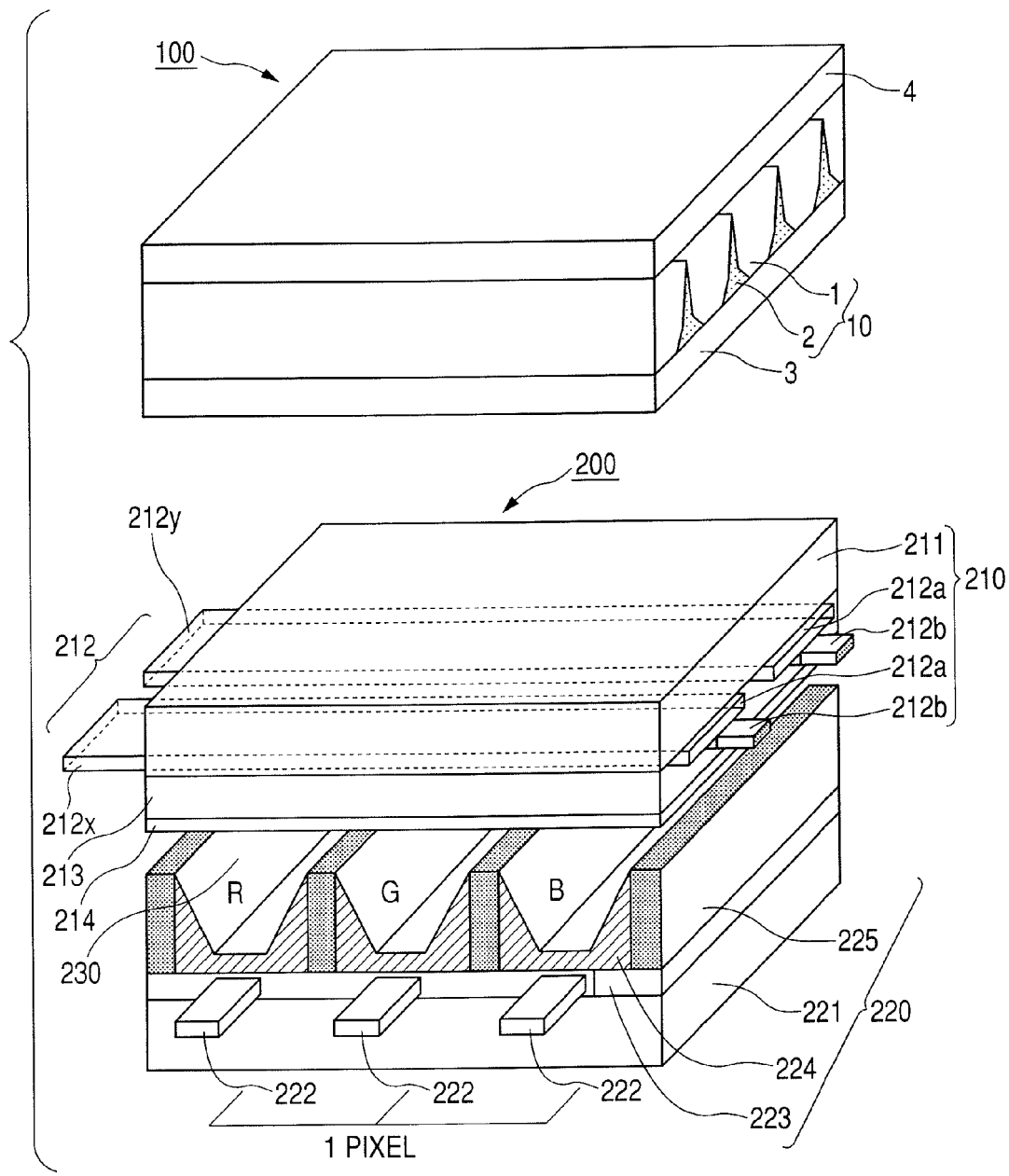
FIG. 1 is a perspective view of a major portion of a display device including a light diffusion component in accordance with an embodiment.

Referring to the drawings, an embodiment of the present invention will be described below.

To begin with, referring to FIG. 1, FIG. 2, and FIG. 3, an embodiment of the present invention will be described below. In the drawings, the same reference numerals shall be assigned to components having identical abilities. An iterative description shall be omitted.

FIG. 1 is a perspective view showing the major portion of a display device including a light diffusion component in accordance with the present embodiment. FIG. 2 is a sectional view illustratively showing the light diffusion component in accordance with the embodiment. FIG. 3 is an enlarged view of the key structure of the light diffusion component in accordance with the present embodiment.

Display devices including a light diffusion component in accordance with the present embodiment include display devices employing a display panel that has display elements, which form pixels, arrayed two-dimensionally, for example, a PDP display device, an LCD display device, and a field emission display device (FED). Herein, for a convenience' sake, a description will be made by taking the PDP display device for instance. However, the present invention shall not be limited to the PDP display device.

For a better understanding of the structure of a PDP, FIG. 1 shows the major portion of a display device with an upper panel thereof and a lower panel thereof separated from each other. FIG. 2 shows a section of a light diffusion component contained in a cutting plane in a vertical direction of a display screen of the display device.

As shown in FIG. 1, the display device (herein, the PDP display device) includes a plasma display panel (PDP) 200 that is an image light source, a light diffusion component 100 disposed on the face of the display screen, and a printed circuit board (not shown) that drives the PDP which is a display unit. A viewer watches image light that is emitted from the PDP 200 and that has a contrast to be ensured in a bright room improved by the light diffusion component 100. The light diffusion component 100 may be directly mounted on the PDP 200 or may be disposed above the PDP 200 at a predetermined distance.

To begin with, the structure of the PDP will be described below. The PDP 200 has an upper panel 210 and a lower panel 220 opposed to each other.

The structure of the upper panel 210 will be described below. The upper panel 210 has stripe display electrodes 212, which are extended in a lateral direction of the display screen (which may be simply called a screen), disposed on an upper glass substrate 211 that is a substrate on the side of the display surface. The display electrodes 212 include X display electrodes (which may be called common electrodes) 212x and Y display electrodes (which may be called scan electrodes) 212y which are groups of electrodes disposed alternately in pairs in parallel with one another. Each of the display electrodes is composed of a transparent electrode 212a and a metallic auxiliary electrode 212b that lowers a resistance. Herein, only one pair of display electrodes 212 (212x and 212y) is shown. A dielectric layer 213 is formed on the display electrodes 212 to cover the display electrodes 212, and a thin protective film 214 made of magnesium oxide (MgO) is formed to cover the dielectric layer 213.

Next, the structure of the lower panel 220 will be described below. The lower panel 220 has parallel stripe address electrodes 222, which are extended in a vertical direction of the screen orthogonally to the display electrodes 212, formed laterally at predetermined intervals on a lower glass substrate 221 that is a back-side substrate. A dielectric layer 223 is formed on the address electrodes 222 to cover the address electrodes 222. Partitions 225 are formed at predetermined intervals on the dielectric layer 223 in parallel with the address electrodes 222 alternately with the address electrodes 222. Red, green, and blue fluorescent substances 224 are applied to the segments on the dielectric layer 223 defined by the partitions 225 in response to three adjoining address electrodes 222 forming one pixel.

The upper panel 210 and lower panel 220 that are structured as mentioned above are opposed to each other so that the display electrodes 212 and address electrodes 222 will be orthogonal to each other, and then sealed with a frit glass or the like that is not shown. Consequently, multiple discharge cells (discharge spaces) 230 are formed at intersections of the multiple display electrodes on the upper panel and the multiple address electrodes on the lower panel. The discharge cells 230 are filled with a mixed gas containing neon (Ne) or xenon (Xe), which is used as a discharge gas, under a predetermined pressure.

A drive circuit (not shown) applies a voltage to any set of address electrodes 222 and any Y display electrode 212y in the PDP 200 having the foregoing structure (which shall be referred to as addressing drive), whereby wall charges are formed. Thereafter, voltages of opposite polarities (sustaining voltage) are applied alternately to a mate X display electrode 212x and the Y display electrode 212y (which shall be referred to as main discharge drive), whereby discharge is sustained. The discharge from the discharge cell 230 derived from the application of the voltages to the electrodes brings about ultraviolet rays. The ultraviolet rays excite the fluorescent substances 224. This causes the fluorescent substances 224 to emit visible light waves of red, green, and blue. Consequently, the light waves (image light) are emitted through the upper glass substrate 211 on the transparent display electrodes.

Next, referring to FIG. 1 and FIG. 2, the light diffusion component 100 in accordance with the present embodiment will be described below.

The light diffusion component 100 serves as part of a so-called optical filter (not shown) having the ability to intercept electromagnetic waves and infrared rays leaking out of the PDP, correct (regulate) colors of light waves emitted from the PDP, and attenuate outside environmental light. Herein, for a better understanding, the light diffusion component 100 alone is shown. The light diffusion component 100 may be formed as an integral part of the optical filter or as a separate unit.

The light diffusion component 100 is intended to attenuate outside environmental light so as to improve a contrast to be ensured in a bright room. The light diffusion component 100 has an incident-side substrate 3, a light diffusion member 10, and an outgoing-side substrate 4 layered in that order from the side of the PDP 200. The light diffusion member 10 includes light transmission pieces 1 and light absorption pieces 2. The light transmission pieces 1 and light absorption pieces 2 are alternately juxtaposed in the vertical direction of the screen.

The light transmission pieces 1 are optical waveguides that introduce incident image light to the side of a viewer. Herein, the light transmission pieces 1 are cyclically juxtaposed at predetermined intervals in a first direction of the PDP 200, for example, the vertical direction of the screen (that is, a direction parallel with the address electrodes 222), and extended in the form of stripes in a second direction orthogonal to the first direction, for example, the lateral (or horizontal) direction of the screen (that is, in a direction parallel with the display electrodes 212). The shape of the sections of the light transmission pieces 1 contained in plane extended in the vertical direction of the screen of the PDP is shaped substantially like a trapezoid whose upper base is oriented to the PDP 200.

The light absorption pieces 2 are outside light interceptive layers that absorb incident output environmental light so as to thus intercept the output environmental light, and colored with a pigment such as carbon or a predetermined dye to such an extent that the pigment or dye will have a predetermined concentration. The light absorption pieces 2 are formed to fill the grooves among the juxtaposed light transmission pieces 1. The sections of the light absorption pieces 2 in the vertical direction of the screen of the PDP 200 are shaped substantially like a wedge whose base is oriented to the PDP that is an image light source. In other words, the light transmission pieces 1 and light absorption pieces 2 are alternately and adjacently juxtaposed in the vertical direction of the screen of the PDP 200. Hereinafter, the section contained in the plane extended in the vertical direction of the screen shall be called merely a section.

In the present embodiment, the light transmission pieces 1 and light absorption pieces 2 are designed to exhibit nearly the same refractive index (strictly speaking, the refractive index n1 of the light transmission pieces 1 is slightly larger than or equal to the refractive index n2 of the light absorption pieces 2). The interface between each pair of the light transmission piece and light absorption piece hardly reflects light. Consequently, among light waves that come from the PDP 200 and fall on each of the light transmission pieces 1 which serve as optical waveguides and which are included in the light diffusion member 10 that is an integral part of the light diffusion component 100, light L1 that vertically falls on the upper base of the trapezoidal section of each light transmission piece 1 goes out directly from the lower base of the trapezoidal section of the light transmission piece 1. However, light L2 that obliquely falls on the upper base of the trapezoidal section of the light transmission piece 1 goes out after being attenuated to an extent proportional to the thickness of an adjoining light absorption piece 2 dependent on the path of the light.

Since the light diffusion component 100 is structured as mentioned above, image light can be sampled in the vertical direction of the screen. While a satisfactory viewing angle is offered in the lateral direction of the screen, a viewing angle to be offered in the vertical direction of the screen is set to a predetermined value and a contrast to be ensured in a bright room can be improved. The viewing angle in the vertical direction of the screen will be described later.

In the present embodiment, outside environmental light L6 obliquely falling on each light absorption piece 2 enters the light absorption piece 2, and part of the outside environmental light L6 is transmitted to an extent proportional to the thickness of the light absorption piece 2 dependent on the path of the light. The outside environmental light attenuated by the light absorption piece 2 is reflected (not shown) from the PDP 200 (for example, the upper glass substrate 211). The reflected light interferes with the incident outside environmental light, whereby moiré occurs. The constitutional feature of the present invention intended to minimize the moiré will be described later.

An example of a method of constructing the light diffusion component 100 will be described below. First, an ultraviolet-cured resin is applied to the entire surface of the outgoing-side substrate 4 in order to form the light transmission pieces 1. Thereafter, the outgoing-side substrate 4 is passed by substantially wedged dying rolls (not shown) one of which has a cavity shaped according to a substantial wedge shape. Consequently, the substantially wedged grooves are formed in the outgoing-side substrate 4. Ultraviolet rays are irradiated to the grooves in order to cure the resin. After the grooves are filled with another ultraviolet-cured resin, ultraviolet rays are irradiated to the grooves. Consequently, the substantially wedged light absorption pieces 2 are formed. Finally, the incident-side substrate 3 is placed in order to protect the resin layer and ease handling of the light diffusion component.

Next, referring to FIG. 3, the key structure of the present embodiment will be described concretely. FIG. 3 is an enlarged view of the key structure of the light diffusion component shown in FIG. 2. In FIG. 3, the incident-side substrate 3 and outgoing-side substrate 4 are not shown.

For a better understanding, a coordinate system shall be defined. As shown in FIG. 3, the center point on the surface of each light absorption piece 2 abutting on the incident-side substrate 3 shall be regarded as an origin. The outgoing direction of image light shall be regarded as a Z axis, and the direction parallel to the surface of each light absorption piece 2 abutting on the incident-side substrate 3 shall be regarded as an X axis.

Figure 3:
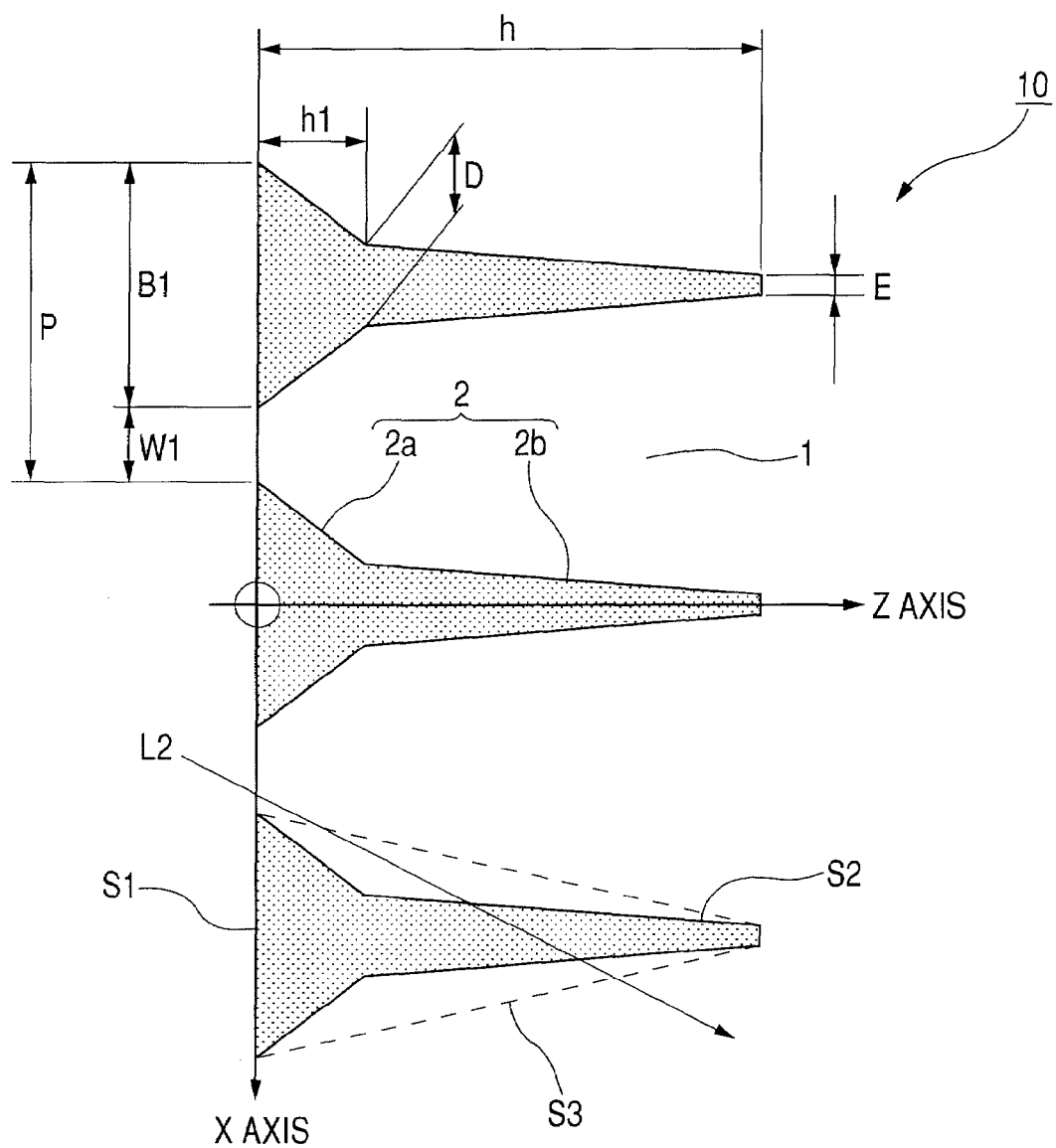
FIG. 3 is an enlarged view showing the key structure of the embodiment.

In FIG. 3, each light absorption piece 2 has a substantially wedged section and includes two wedged portions having different slopes. A first wedged portion 2a is in contact with or coupled to the incident-side substrate 3, and the section of the first wedged portion 2a has a large slope with respect to the Z axis and is shaped substantially like a trapezoid. Moreover, a second wedged portion 2b is joined to the first wedged portion 2a, and the section of the second wedged portion 2b has a small slope with respect to the Z axis and is shaped substantially like a wedge. The PDP-side part of the section of the light absorption piece 2 orthogonal to the Z axis has a larger area, and the distal part thereof is shaped substantially like an elongated nail. The reasons why the light absorption piece 2 has the foregoing shape will be described later. One of the reasons is to alleviate the adverse effect of moiré. Moreover, the apex (distal end) of the second wedged portion 2b is not sharpened but flattened. This is attributable to a manufacturing process.

Next, the concrete structures of the light transmission pieces 1 and light absorption pieces 2 will be described below. An example of dimensions will be presented first.

In the present embodiment, the length B1 of the base of the section of each light absorption piece 2 (that is, the lower base of the section of the first wedged portion 2a) is 50 μm, the height h thereof is 104 μm, and the width E of the apex thereof is 4 μm. The height hi of the section of the first wedged portion 2a that is the proximal part of the light absorption piece 2 is 20.8 μm, the length D of the upper base thereof is 14.36 μm. On the other hand, the length W1 of the upper base of the trapezoidal section of each light transmission piece 1 sandwiched between adjoining light absorption pieces 2 is 15 μm. The base of the section of the first wedged portion 2a and the upper base of the trapezoidal section of the light transmission piece 1 adjoin each other. Consequently, the width P of one pair of the light transmission piece 1 and light absorption piece 2 comes to 65 μm. Assuming that the occupancy of the light transmission pieces 1 relative to the display surface of the PDP is regarded as an aperture ratio ρ, the aperture ratio ρ shall be defined as the equation (1) below. In the present embodiment, the aperture ratio ρ comes to 23.1%.

$$\rho = W1/(W1+B1) \tag{1}$$

The width P of one pair of the light transmission piece 1 and light absorption piece 2 is set to a quarter or less of the length of one pixel in the PDP in consideration of the adverse effect of sampling.

Next, the materials to be made into the light transmission pieces 1 and light absorption pieces 2 will be described below.

In the present embodiment, a material whose transmittance for a visible spectrum is 100% is adopted for the light transmission pieces 1, and a material whose transmittance for the visible spectrum is 4% per 60 μm is adopted for the light absorption pieces 2. For example, polycarbonate that is used to make optical lenses is adopted for the light transmission pieces 1. Since the transmittance of polycarbonate for the visible spectrum is approximately 90% (when the thickness of polycarbonate is 3 mm), assuming that the thickness is converted to the value of the height h of 0.104 mm, the transmittance is calculated as $0.90^{0.104/3}=0.996$. Namely, the transmittance is nearly 100%. Moreover, the light absorption pieces 2 are colored with a pigment such as carbon or a predetermined dye in order to absorb outside environmental light to such an extent that the pigment or dye will have a predetermined concentration. Incidentally, the materials to be made into the light transmission pieces 1 and light absorption pieces 2 respectively share the same refractive index of 1.55.

Next, the problems underlying conventional light diffusion components and being noticed by the present inventor et al. will be described below in conjunction with FIG. 9 to FIG. 12D.

Figure 9:
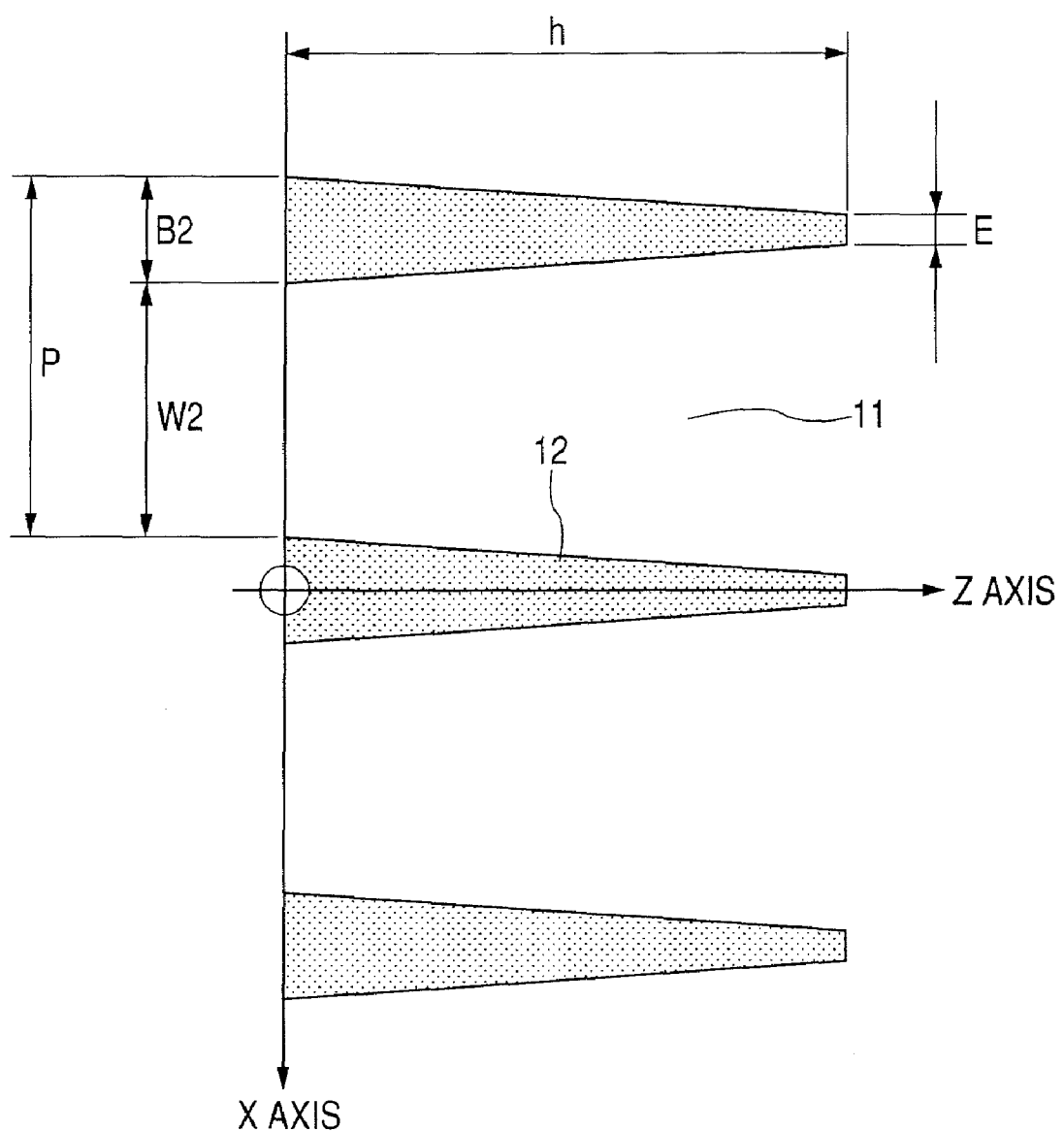
FIG. 9 is an enlarged view showing the major portion of a related art.

FIG. 9 is an enlarged view of the key structure of a conventional light diffusion component described in Japanese Patent Application Laid-Open Publication No. 2006-189867. A coordinate system having an origin at the center of the base of each light absorption piece is defined in FIG. 9 in the same manner as that is in FIG. 3.

In FIG. 9, light transmission pieces 11 each have a trapezoidal section whose upper base is oriented to a PDP that is an image light source. Light absorption pieces 12 each have a wedged section whose base is oriented to the PDP that is the image light source. The light transmission pieces 11 and light absorption pieces 12 are alternately and adjacently juxtaposed.

Each of the light absorption pieces 12 has a wedged section. The length B of the base of the section of the light absorption piece is 19.5 μm, the height h of the section thereof is 104 μm, and the width E of the apex thereof is 4 μm. The light transmission pieces 11 are juxtaposed to fill the spaces among the light absorption pieces 12. Since the length W2 of the upper base of the section of each light transmission piece 11 is 45.5 μm, the width P of one pair of the light transmission piece 11 and light absorption piece 12 is 65 μm.

A material whose transmittance for the visible spectrum is 100% is adopted for the light transmission pieces 11, and a material whose transmittance therefor is 4% per 60 μm is adopted for the light absorption pieces 12.

Figure 10:
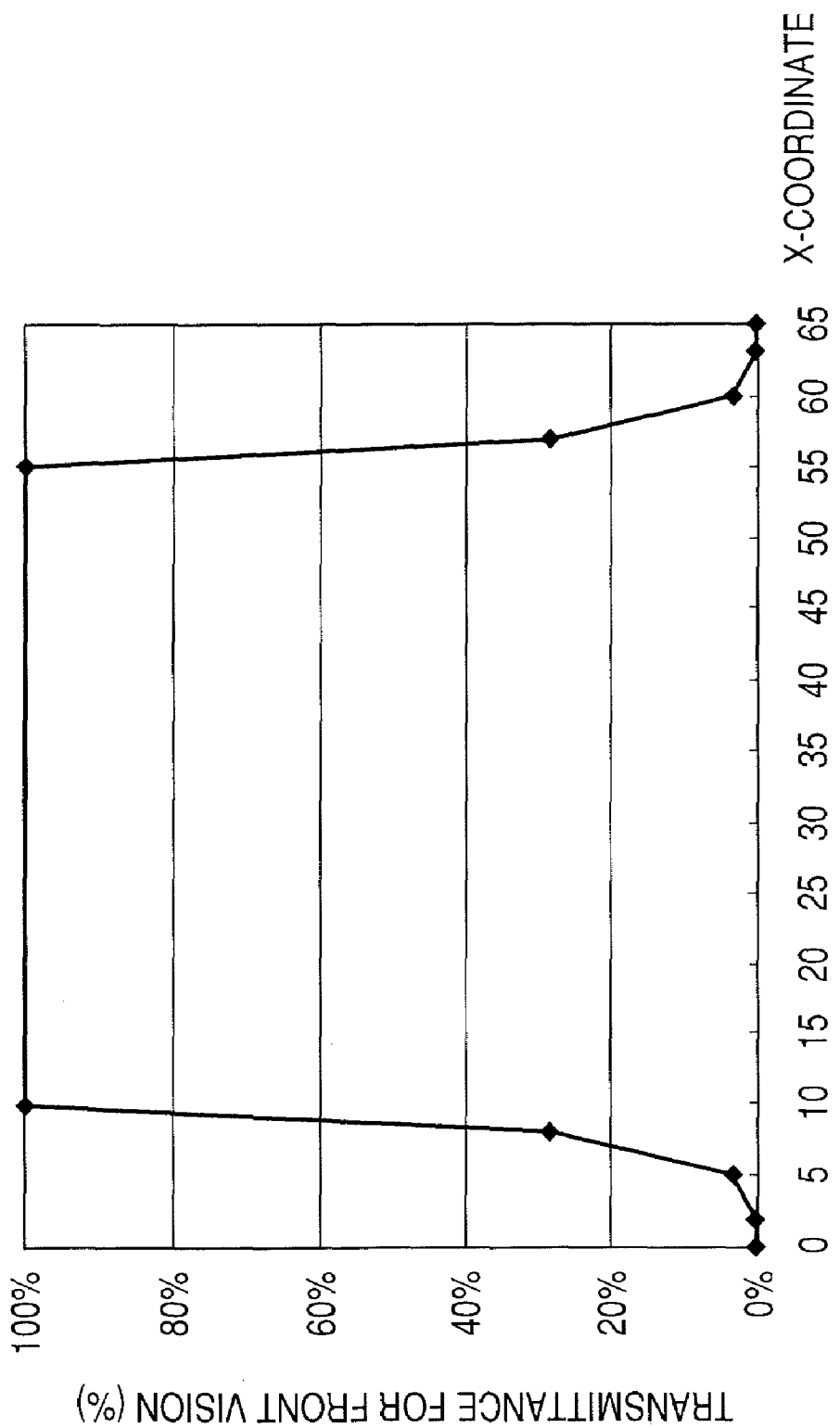
FIG. 10 shows transmittances observed when the related art is seen from the front thereof.

FIG. 10 is a graph indicating transmittances observed in the vertical direction of the screen in the light diffusion component shown in FIG. 9 when the screen is seen from the front thereof on the side of a viewer, or in other words, transmittances observed in the X-axis direction when the screen is seen from the Z-axis direction in FIG. 9.

Based on coordinates (0,104) representing a center point of the base of the section of each light absorption piece 12, coordinates (2,104), coordinates (9.75,0), and coordinates (32.5,0) within a range of X coordinates defined with a half of a pitch P starting with the light absorption piece, the lengths of the light absorption piece 12 in the Z-axis direction are obtained according to the equations (2) below. Thereafter, transmittances per 0.06 mm exhibited by the light absorption piece 12 are calculated by converting the transmission of 4% per 60 μm according to the equation (3). Thus, the transmittances T listed in the form of Table 1 and graphically shown in FIG. 9 are calculated. As for the other half of the pitch P ending with an adjoining light absorption piece, the transmit tances are determined in consideration of the symmetry with the half thereof starting with the light absorption piece 12.

$$Z=104\ (0\leq X\leq 2)$$

$$Z=104/(2-9.75)\times(X-9.75)\ (2\leq X\leq 9.75)$$

$$Z=0\ (9.75\leq X\leq 32.5) \quad (2)$$

$$T=0.04^{(Z/0.06)} \quad (3)$$

TABLE 1

| X-coordinate | Length of a light absorption piece | Transmittance |
| --- | --- | --- |
| 0 | 104 | 0.4% |
| 2 | 104 | 0.4% |
| 5 | 64 | 3.3% |
| 8 | 23 | 28.4% |
| 9.75 | 0 | 100.0% |
| 55.25 | 0 | 100.0% |
| 57 | 23 | 28.4% |
| 60 | 64 | 3.3% |
| 63 | 104 | 0.4% |
| 65 | 104 | 0.4% |

As seen from FIG. 10, the characteristic curve representing the transmittances is substantially rectangular.

On the other hand, the light diffusion component includes a regular array of light transmission and absorption pieces. In this case, as described in Japanese Patent Application Laid-Open Publication No. 2006-189867, when the cyclic array of light absorption pieces reflects light on the front substrate included in the PDP, moiré occurs due to interference between an original pattern and a pattern caused by reflected light. The relationship of the regular array of light transmission pieces 11 and light absorption pieces 12 to occurrence of moiré has been discussed.

Figure 11A:
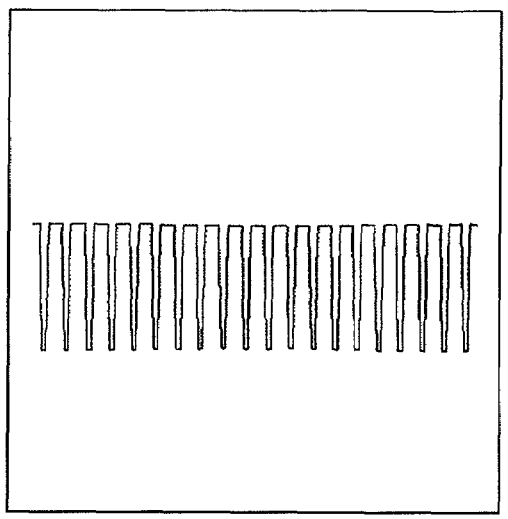
FIGS. 11A to 11D show interference of rectangular waves occurring in an optical model employed in the related art.
Figure 11B:
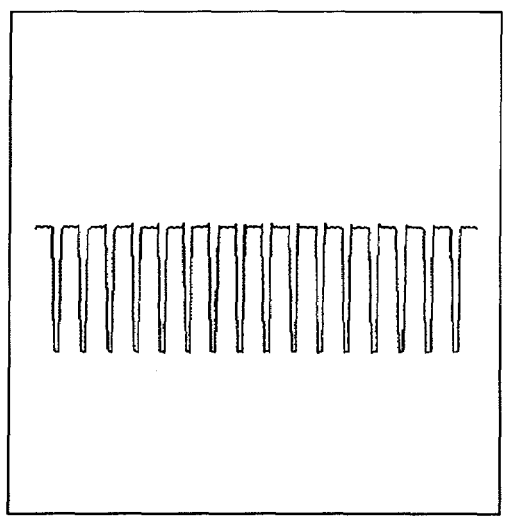
Figure 11C:
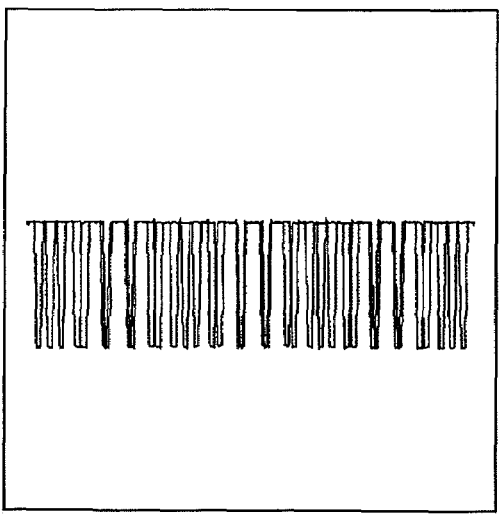
Figure 11D:
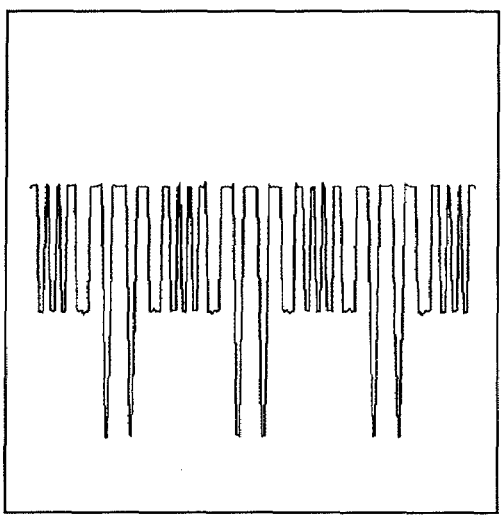

FIGS. 11A to 11D show interference of rectangular waves occurring in an optical model employed in a related art. FIG. 11A shows a rectangular wave having a wavelength of 10 mm, FIG. 11B shows a rectangular wave having a wavelength of 12 mm, FIG. 11C shows the result of superposition of the two rectangular waves, and FIG. 11D shows the result of summation of the two rectangular waves.

As apparent from FIG. 11D, the summation of two rectangular waves causes heaves, that is, moiré. The reasons why the waves having the wavelengths of 10 mm and 12 mm respectively are used to calculate heaves, that is, moiré will be described below.

Figure 12A:
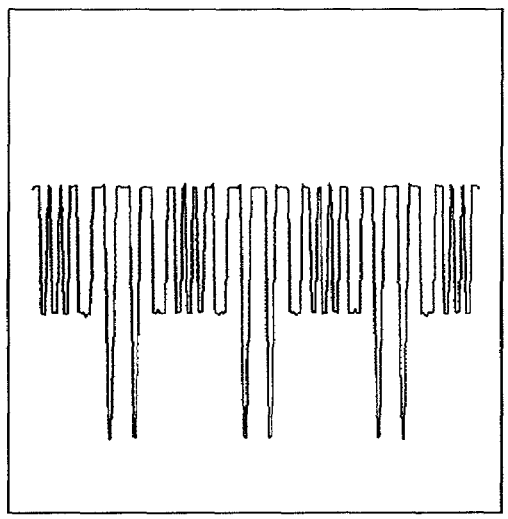
FIGS. 12A to 12D show changes in interference of rectangular waves occurring in an optical model employed in the related art due to a difference in wavelength.
Figure 12B:
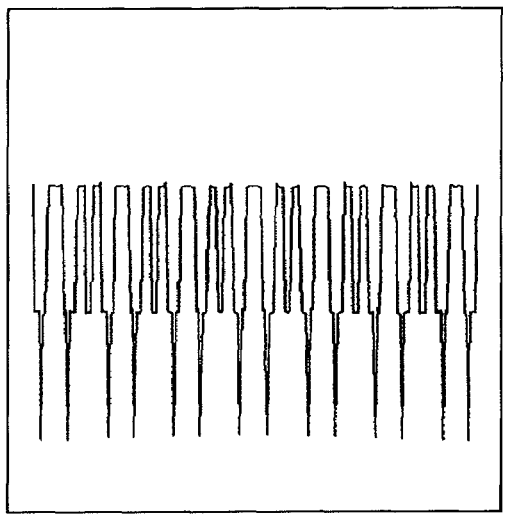
Figure 12C:
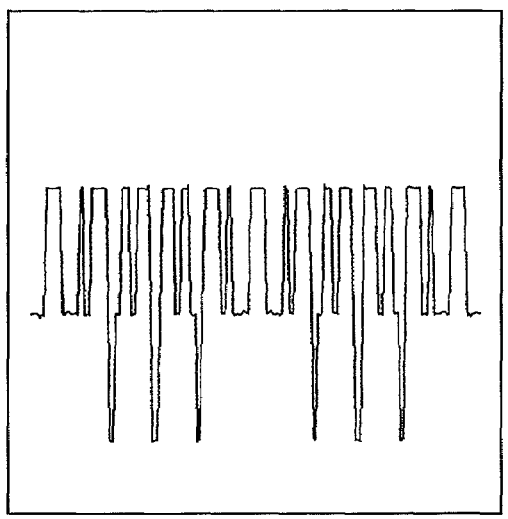
Figure 12D:
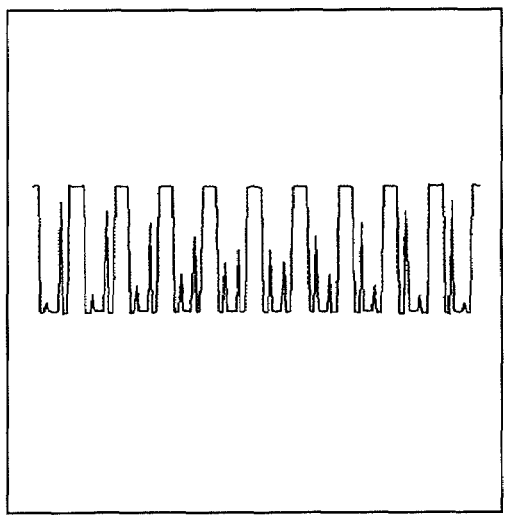

FIGS. 12A to 12D show changes in the interference of rectangular waves, which occur in the optical model employed in the related art, due to a difference in wavelength. FIG. 12A shows the result of summation of the waves having the same wavelengths 10 mm and 12 mm respectively as the waves shown in FIG. 11D. FIG. 12B shows the result of summation of the waves having the wavelengths of 10 mm and 15 mm respectively. FIG. 12C shows the result of summation of the waves having the wavelengths of 10 mm and 18 mm. FIG. 12D shows the result of summation of the waves having the wavelengths of 10 mm and 20 mm respectively. The drawings demonstrate that summation of waves having similar wavelengths causes heaves, that is, moiré.

The results of summations shown in FIGS. 11A to 11Ds and FIGS. 12A to 12D will be discussed in terms of rectangular waves. The rectangular waves have steep leading and trailing edges. Therefore, the wave resulting from the summation of the rectangular waves exhibits a steep gradient.

Figure 4:
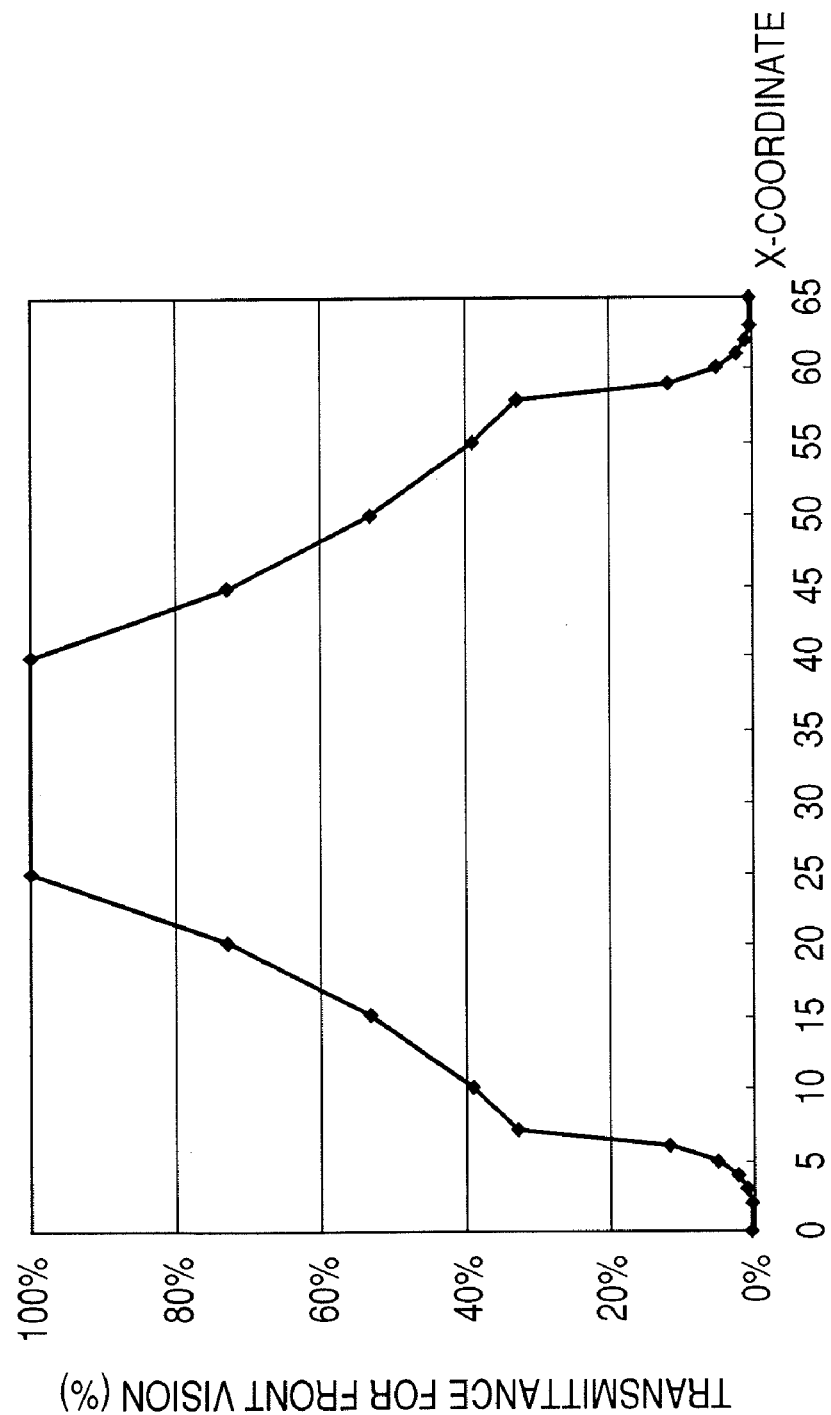
FIG. 4 graphically shows transmittances observed in the key structure of the embodiment when the display device is seen from the front thereof.

In efforts to alleviate the steepness in the leading and trailing edges of waves, the shapes of the light transmission pieces 1 and light absorption pieces 2 have been discussed. The light diffusion component shown in FIG. 2 results from improvements made so that the characteristic curve representing transmittances will look like a sine wave. FIG. 4 shows the characteristic curve representing transmissions.

FIG. 4 shows the characteristic curve representing transmittances observed in the vertical direction of the screen in the light diffusion component shown in FIG. 3 when the screen is seen from the front thereof on the side of a viewer, that is, transmittances observed in the X-axis direction when the screen is seen from the Z-axis direction shown in FIG. 3.

Even for the graph of FIG. 4, based on coordinates (0,104) representing the center point of the base of the section of each light absorption piece 2, coordinates (2,104), coordinates (7.181,20.8), coordinates (25,0), and coordinates (32.5,0), the lengths of the light absorption piece 12 in the Z-axis direction are calculated according to the equations (4) presented below. Thereafter, transmittances T are calculated by converting the transmittance of 4% of the light absorption piece 2 per 60 μm according to the equation (3). Thus, the transmittances T listed in Table 2 and graphically shown in FIG. 4 are calculated. Incidentally, the transmittances observed at points in the other half of the pitch P ending with an adjoining light absorption piece are determined in consideration of the symmetry with the half thereof starting with the light absorption piece.

$$Z=104 \ (0 \leq X \leq 2)$$

$$Z=(104-20.8)/(2-7.181) \times (X-7.181)+20.8$$
$$(2 \leq X \leq 7.18)$$

$$Z=20.8/(7.181-25) \times (X-25) \ (7.18 \leq X \leq 25)$$

$$Z=0 \ (25 \leq X \leq 32.5) \tag{4}$$

TABLE 2

| X-coordinate | Length of a light absorption piece (along Z axis) | Transmittance |
|---|---|---|
| 0 | 104 | 0.4% |
| 2 | 104 | 0.4% |
| 3 | 88 | 0.9% |
| 4 | 72 | 2.1% |
| 5 | 56 | 5.0% |
| 6 | 40 | 11.8% |
| 7.181 | 20.8 | 32.8% |
| 10 | 18 | 39.1% |
| 15 | 12 | 53.5% |
| 20 | 6 | 73.1% |
| 25 | 0 | 100.0% |
| 40 | 0 | 100.0% |
| 45 | 6 | 73.1% |
| 50 | 12 | 53.5% |
| 55 | 18 | 39.1% |
| 57.819 | 20.8 | 32.8% |
| 59 | 40 | 11.8% |
| 60 | 56 | 5.0% |
| 61 | 72 | 2.1% |
| 62 | 88 | 0.9% |
| 63 | 104 | 0.4% |
| 65 | 104 | 0.4% |

According to the present embodiment, as shown in FIG. 4, the characteristic curve representing transmittances looks substantially like a sine wave.

Next, moiré occurring in the present embodiment will be described in conjunction with FIGS. 5A to 5D and FIGS. 6A to 6D.

Figure 5A:
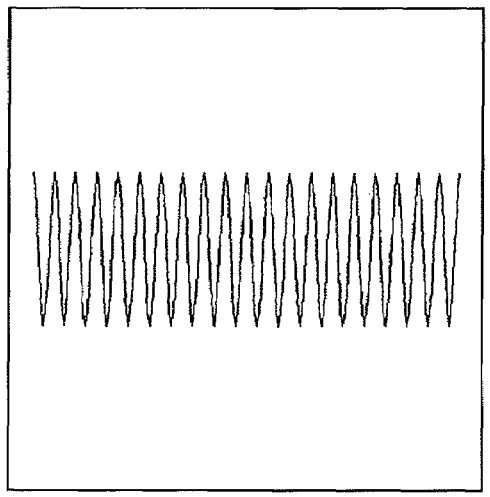
FIGS. 5A to 5D illustratively show interference of sine waves occurring in an optical model employed in the embodiment.
Figure 5B:
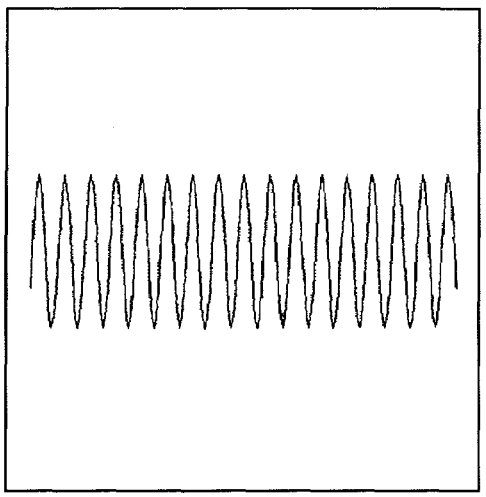
Figure 5C:
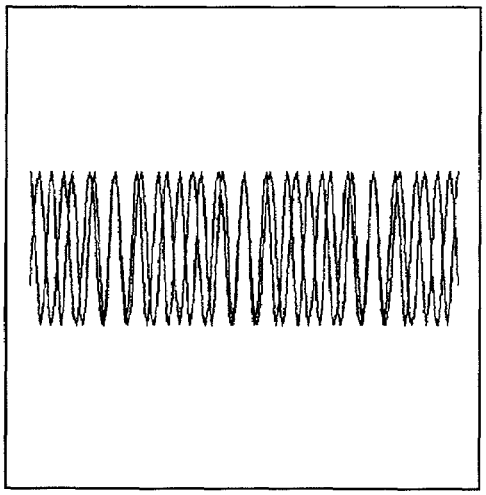
Figure 5D:
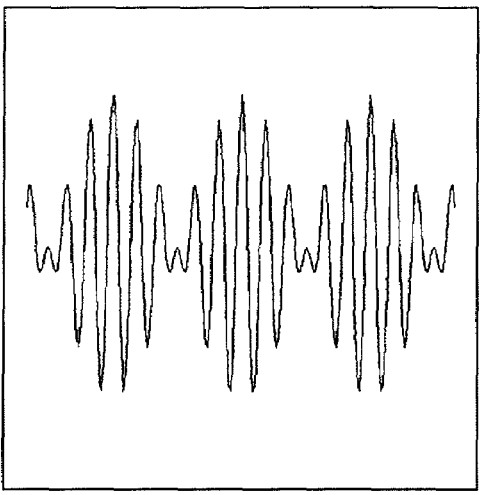
Figure 6A:
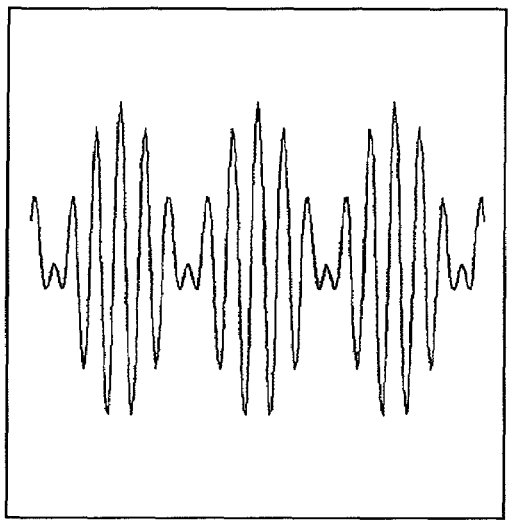
FIGS. 6A to 6D show changes in interference of sine waves occurring in an optical model employed in the embodiment due to a difference in wavelength.
Figure 6B:
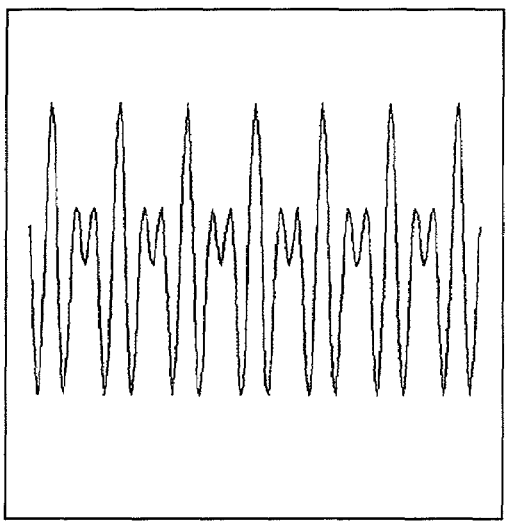
Figure 6C:
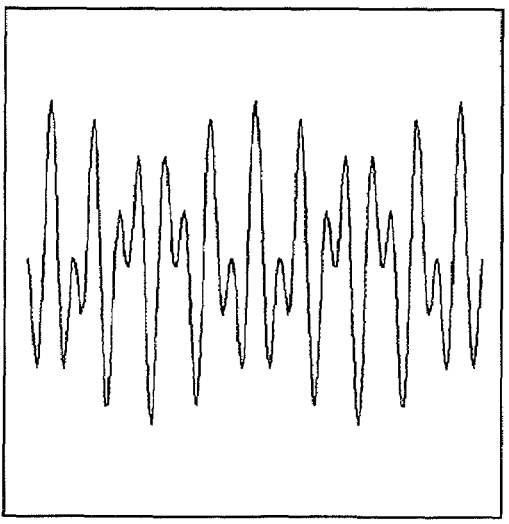
Figure 6D:
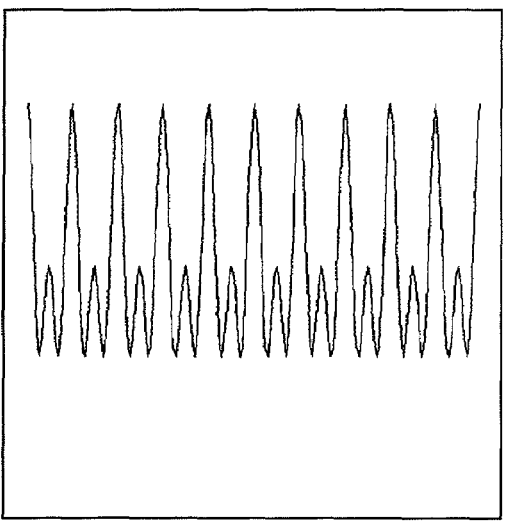

FIGS. 5A to 5D show interference of sine waves occurring in an optical model employed in the present invention. FIGS. 6A to 6D show changes in the interference of sine waves derived from a difference in wavelength. Similarly to the rectangular waves employed in the related art, when sine waves having similar wavelengths are summated, heaves, that is, moiré markedly occurs. FIG. 5A shows the sine wave having a wavelength of 10 mm, and FIG. 5B shows a sine wave having a wavelength of 12 mm. FIG. 5C shows a result of superposition of the two sine waves, and FIG. 5D shows a result of summation of the two sine waves. As shown in FIG. 5D, when the sine waves are summated, heaves, that is, moiré occurs. A change in the interference of sine waves derived from a difference in wavelength has been calculated. Similarly to FIGS. 12A to 12D, when the sine waves similar wavelengths are summated, heaves, that is, moiré occurs. When the result of summation of sine waves employed in the present embodiment is compared with the result of summation of the rectangular waves employed in the related art, the steepness in the leading or trailing edge of the resultant wave shown in FIG. 5D is less than that in the leading or trailing edge of the resultant wave shown in FIG. 11D.

The description of the sectional shape of each light absorption piece 2 shown in FIG. 3 will be supplemented below.

As apparent from FIG. 4, when the characteristic curve representing transmittances exhibited by the light absorption piece 2 looks like a sine wave, a range of light rays to be intercepted by each light absorption piece 2 gets widened. Consequently, an aperture ratio has to be decreased. However, while the sectional shape in the related art shown in FIG. 9 is adopted as it is, if the aperture ratio is decreased, the sectional area of the light absorption piece 2 gets larger. Consequently, the transmittance of the light absorption piece 2 for image light (and a viewing angle) decreases. When the aperture ratio is decreased, if the sectional area of the light absorption piece 2 should not be reduced, a trapezoid enclosing the section of the light absorption piece 2, that is, a trapezoid bordering the section of the light absorption piece 2 is defined, and the sectional area of the light absorption piece 2 is determined with the ratio of the sectional area to the area of the bordering trapezoid (hereinafter, the ratio to the bordering trapezoidal area).

Specifically, in the present embodiment, as shown in FIG. 3, the outline of the section of each light absorption piece 2 is dented so that image light L2 obliquely falling on the light absorption piece 2 can go out of the light absorption piece 2 while being slightly absorbed and attenuated. When it says that the outline of the section of the light absorption piece 2 is dented, it means that an angle at which the straight line linking the apex of the section and the edge of the base thereof meets the Z axis gradually diminishes toward the outgoing side of the image light (along the Z axis). Owing to the outline of the section, even when an aperture ratio remains unchanged, a viewing angle attained in the vertical direction of the screen can be expanded.

Specifically, each light absorption piece 2 is composed of two wedged portions. The slope of the first wedged portion 2a, which contains the base of the section of the light absorption piece 2, with respect to the Z axis is made larger, and the slope of the second wedged portion 2b with respect to the Z axis is made smaller. However, the present embodiment is not limited to this shape. Alternatively, the two slopes are defined in order to form one dent but multiple slopes may be defined in order to form multiple dents. Otherwise, the outline of the section of the light absorption piece may be streamlined.

Referring to FIG. 3, assuming that S1 denotes the sectional area of the first wedged portion 2a, S2 denotes the sectional area of the second wedged portion 2b, and S3 denotes the area of the bordering trapezoid, the ratio to the bordering trapezoidal area (S+S2)/S3 comes to 51% in the present embodiment according to the equations (5) (5-1 to 5-3) and (6) below.

$$S1=(7.181\times2+25\times2)\times20.8\div2=668$$

$$S2=(2\times2+7.181\times2)\times(104-20.8)\div2=764$$

$$S3=(2\times2+25\times2)\times104\div2=1433 \qquad (5)$$

Ratio to bordering trapezoidal area $$=(S1+S2)/S3=51(\%) \qquad (6)$$

As the ratio to the bordering trapezoidal area increases, image light (and a viewing angle) decreases as mentioned above. Therefore, the ratio to the bordering trapezoidal area should be equal to or smaller than ⅔. Moreover, when the ratio to the bordering trapezoidal area is too small, the interceptive action to be applied to outside environmental light is lessened. The ratio to the bordering trapezoidal area should therefore be equal to or larger than ⅓.

Incidentally, if the width E of the apex of the substantially wedged section of each light absorption piece 2 can be set to 0, the bordering trapezoid may be changed to a bordering triangle.

Moreover, the description of the aperture ratio 23.1% calculated according to the equation (1) will be supplemented in terms of a sine wave.

An angular range within 0° to 180° in which a sine wave exhibits 90% or more of its amplitude shall be regarded as a quasi range in which the sine wave exhibits 100% its amplitude, the ratio of the angular range to the range from 0° to 180° is calculated. Since the phase of a sine wave exhibiting 90% of the amplitude thereof is provided as $\sin^{-1}0.9=64.2°$, the angular range in which the sine wave exhibits 90% or more of its amplitude is from 64.2° to 115.8° (=180−64.2). Consequently, the ratio of the angular range to the range from 0° to 180° is calculated as (115.8−64.2)/180=28.7%. The value corresponds to the aperture ratio provided by the equation (1).

When the aperture ratio is increased, the sine wave comes to resemble a rectangular wave. The aperture ratio should preferably be equal to or smaller than 40%. Moreover, when the aperture ratio is too small, since the transmittance for image light decreases, the aperture ratio should preferably be equal to or larger than 10%.

Figure 7:
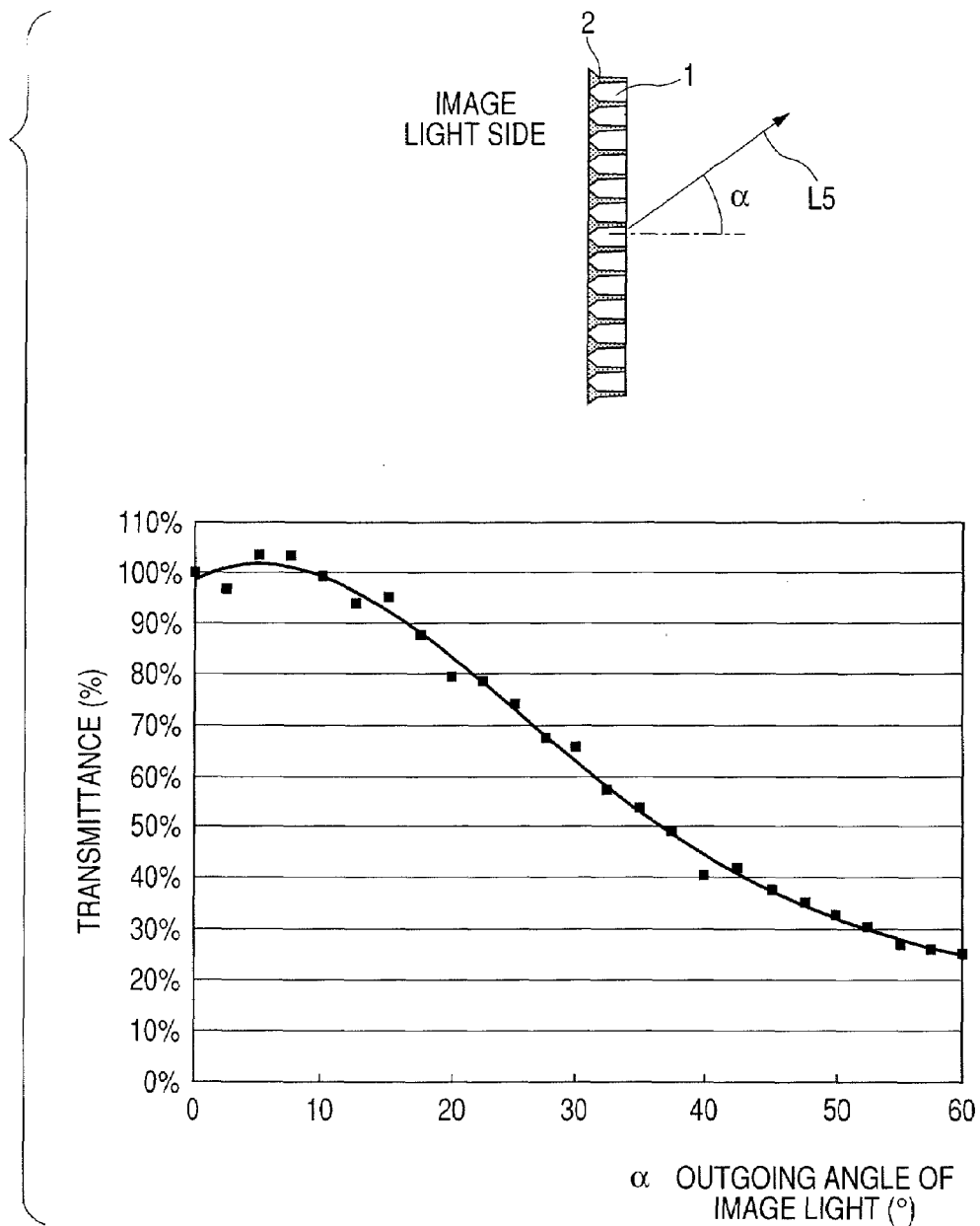
FIG. 7 shows a viewing angle discussed in the embodiment.

FIG. 7 shows a viewing angle in the vertical direction of the screen offered by the light diffusion component in accordance with the present embodiment shown in FIG. 3. FIG. 8 shows transmittances for outside environmental light.

FIG. 7 shows the relationship between an outgoing angle α(°), at which light that comes from the image light source and falls on the array of light transmission pieces 1 and light absorption pieces 2 shown in FIG. 3 goes out of the light diffusion component, and a transmittance (%). The outgoing angle is adopted instead of an incident angle, because light is refracted or reflected within the light diffusion component, though it depends on a refractive index. A viewing angle of 40° or less is attained relative to the half value of the outgoing angle shown in FIG. 7. In general, as far as a direct-vision display device such as a PDP display device is concerned, the display screen may be seen obliquely. A viewing angle in the lateral direction of the display screen should therefore be wide enough. As for the vertical direction of the screen, since the screen is rarely seen from above, the viewing angle in the vertical direction of the screen may not be very wide. The viewing angle of about 40° attained relative to the half outgoing angle value is wide enough.

Figure 2:
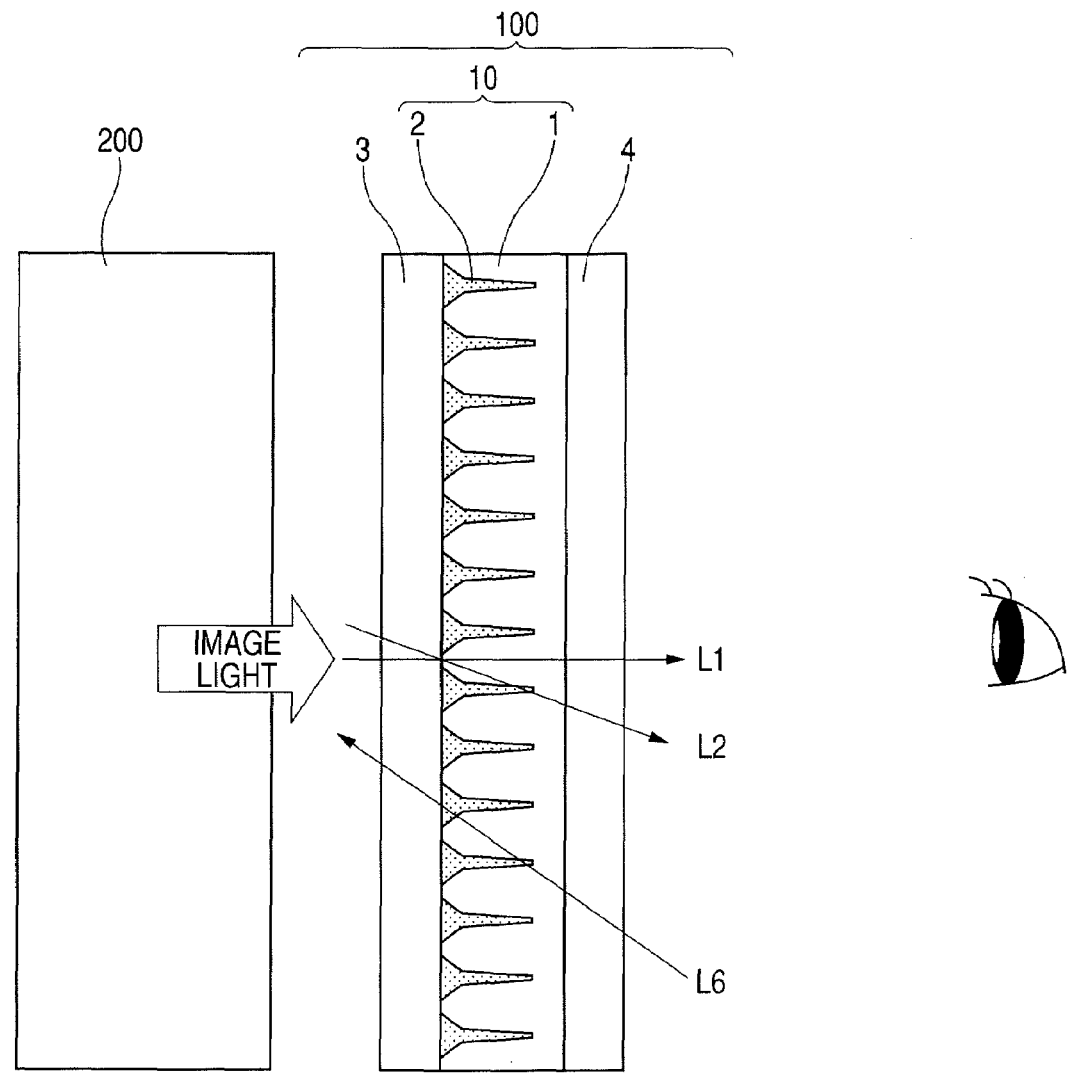
FIG. 2 is a sectional view illustratively showing the light diffusion component in accordance with the embodiment.

In reality, as seen from the illustrative view of FIG. 2, the incident-side substrate 3 is included. Light incident on the incident-side substrate 3 goes out at the same angle as the incident angle thereof. Therefore, an optical model not including the incident-side substrate 3 can be used for the calculation.

Figure 8A:
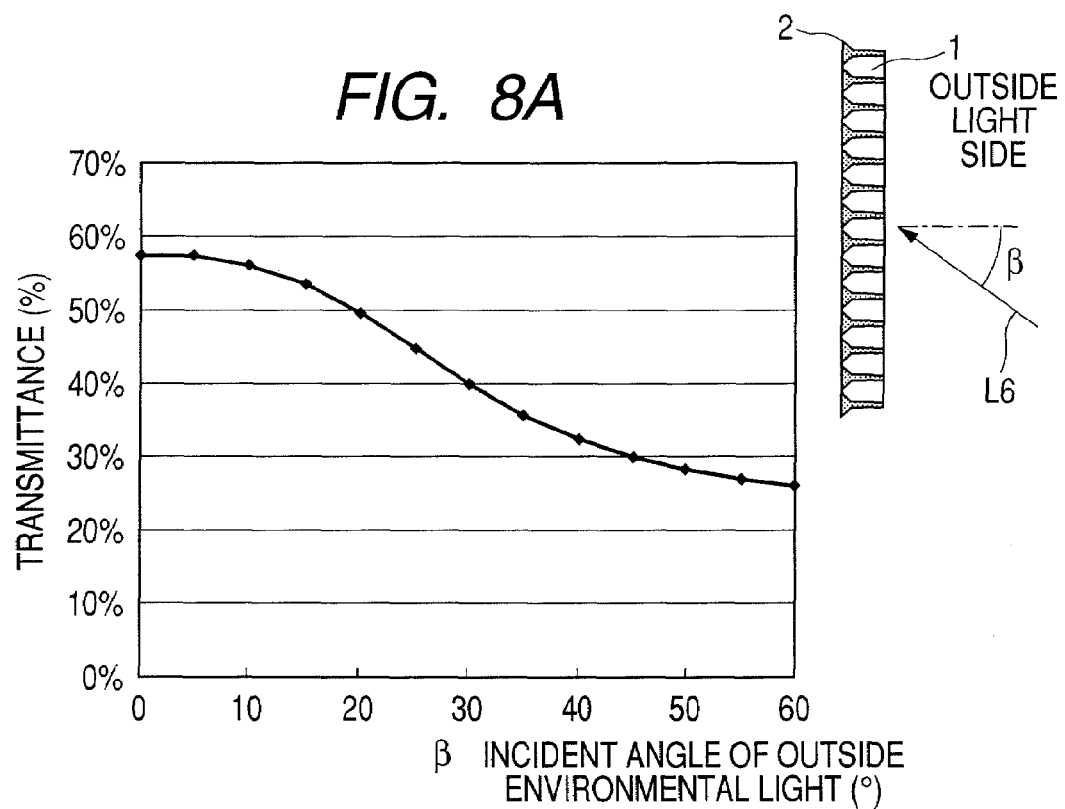
FIGS. 8A and 8B show transmittances for outside light discussed in the embodiment.
Figure 8B:
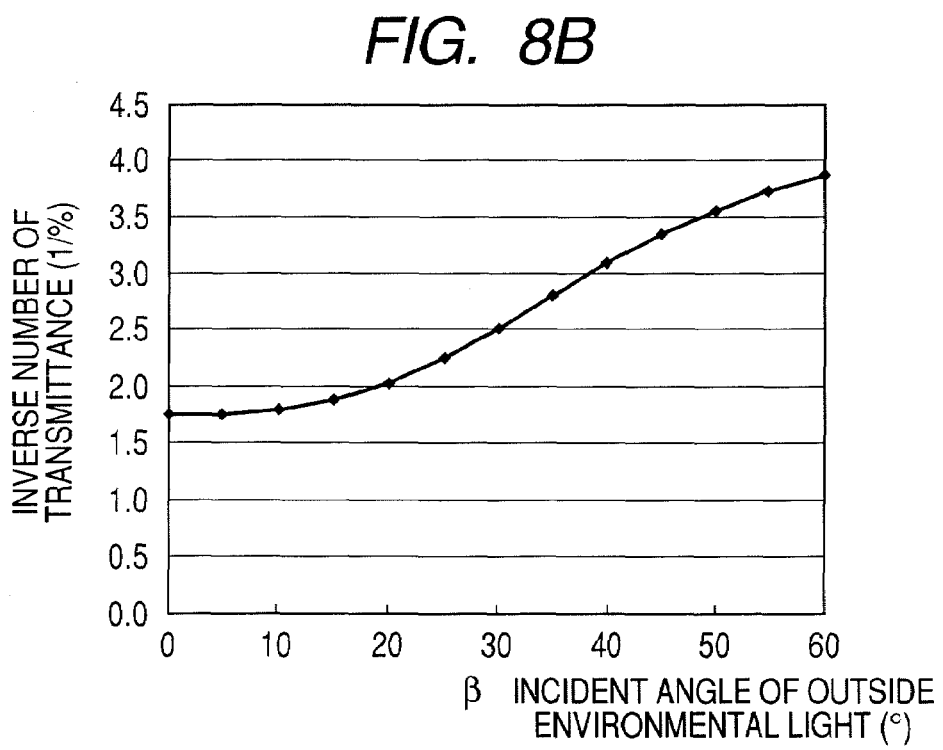

On the other hand, FIG. 8A graphically shows transmittances (%) observed when light L6 is irradiated from a viewer side to the array of light transmission pieces 1 and light absorption pieces 2 shown in FIG. 3 at predetermined angles β(°). Herein, the transmittance refers to a mean transmittance offered by each pair of the light transmission piece 1 and light absorption piece 2. Assuming that the angle β of outside environmental light (light L6) is, for example, 0°, the majority thereof falls on each light transmission piece 1, and part thereof falls on a mate light absorption piece 2 and is absorbed thereby. Therefore, the mean transmittance is regarded as 60% or less. This leads to an improved contrast to be ensured in a bright room. Moreover, when the angle β gets larger, the ratio of the portion of the outside environmental light incident on the light absorption piece 2 to the entire outside environmental light which obliquely falls on the light diffusion component increases (and the frequency by which part of the outside environmental light falls on the light absorption piece also increases). The mean transmittance gradually decreases, and the bright-room contrast further improves. FIG. 8B graphically shows the inverse numbers of the transmittances, and demonstrates that a satisfactory contrast (bright-room contrast) is ensured despite convergence of outside environmental light entering at a small incident angle. The outside environmental light entering at a small incident angle includes sunlight and light emanating from a room ceiling lighting and being reflected from a window glass or the like. Moreover, the values graphically shown in FIG. 7 are calculated using an optical model, which has the outgoing-side substrate 4 removed therefrom, for the same reason as the reason described in conjunction with FIGS. 6A to 6D.

As described so far, according to the embodiment, a characteristic curve representing transmittances looks substantially like a sine wave. Consequently, while a viewing angle and a contrast to be ensured in a bright room are wide enough or satisfactory for image display devices, the adverse effect of moiré attributable to outside environmental light can be alleviated.

What is claimed is:

1. A light diffusion component to be disposed on a front surface of a display panel, the display panel being used for an image display device, comprising:
   a transmission piece extending in a horizontal direction of the display panel, and having a substantially trapezoidal cross-section in a plane extended in a vertical direction of the display panel;
   a light absorption piece extending in the horizontal direction of the display panel, and having a substantially wedged cross-section in a plane extended in the vertical direction of the display panel, the substantially wedged cross-section becoming thinner in a direction of an image light from the display panel;
   wherein the light transmission piece and the light absorption piece are alternated and juxtaposed in the vertical direction of the display panel;
   wherein the light absorption piece includes a first wedged portion located at a side of the display panel, and a second wedged portion joined to the first wedged portion;

wherein a slope of the first wedged portion with respect to the image light direction is larger than a slope of the second wedged portion with respect to the image light direction;

wherein a bordering trapezoid of the substantially wedged cross-section of the light absorption piece is at least partially delimited by two proximal edges of the first wedged portion at the display panel side and two distal edges of the second wedged portion farthest away from the display panel side; and wherein a combined area of a cross-section of the first wedged portion in a plane extended in the vertical direction and an area of a cross-section of the second wedged portion in a plane extended in the vertical direction is at least equal to ⅓ and no greater than ⅔ of an area of the cross-section of the bordering trapezoid in a plane extended in the vertical direction.

2. The light diffusion component according to claim 1, wherein a length of a base of the substantially wedged cross-section of the light absorption piece at the display panel side is larger than a length of a base of the substantially trapezoidal cross-section of the light transmission piece at the display panel side.

3. The light diffusion component according to claim 1, wherein defining that B1 denotes a length of a base of the substantially wedged cross-section of the light absorption piece at the display panel side and W1 denotes a length of a base of the trapezoidal section of the light transmission piece at the display panel side, an aperture ratio provided as W1/(W1+B1) is equal to or larger than 10% and equal to or smaller than 40%.

4. A light diffusion component to be disposed on a front surface of a display panel, the display panel being used for an image display device, comprising:
a transmission piece extending in a horizontal direction of the display panel, and having a substantially trapezoidal cross-section in a plane extended in a vertical direction of the display panel;
a light absorption piece extending in the horizontal direction of the display panel, and having a substantially wedged cross-section in a plane extending in a vertical direction of the display panel, the substantially wedged cross-section becoming thinner in a direction of an image light from the display panel;
wherein the light transmission piece and the light absorption piece are alternated and adjacently juxtaposed in the vertical direction of the display panel; and
wherein defining that B1 denotes a length of a base of the substantially wedged cross-section of the light absorption piece at a side of the display panel and W1 denotes a length of a base of the substantially trapezoidal cross-section of the light transmission piece at the display panel side, an aperture ratio provided as W1/(W1+B1) is equal to or larger than 10% and equal to or smaller than 40%.

5. The light diffusion component according to claim 4, wherein the light absorption piece includes a first wedged portion located at the display panel side, and a second wedged portion joined to the first wedged portion, and
wherein a slope of the first wedged portion with respect to the image light direction is larger than a slope of the second wedged portion with respect to the image light direction.

6. An image display device comprising:
a display panel; and
a light diffusion component to be disposed on a front surface of the display panel,
wherein the light diffusion component includes:
a transmission piece extending in a horizontal direction of the display panel, and having a substantially trapezoidal cross-section in a plane extending in a vertical direction of the display panel; and
a light absorption piece extending in the horizontal direction of the display panel, and having a substantially wedged cross-section in a plane extending in a vertical direction of the display panel, the substantially wedged cross-section becoming thinner in a direction of an image light from the display panel;
wherein the light transmission piece and the light absorption piece are alternated and adjacently juxtaposed in the vertical direction of the display panel;
wherein the light absorption piece includes a first wedged portion located at a side of the display panel, and a second wedged portion joined to the first wedged portion;
wherein a slope of the first wedged portion with respect to the image light direction is larger than a slope of the second wedged portion with respect to the image light direction;
wherein a bordering trapezoid of the substantially wedged cross-section of the light absorption piece is at least partially delimited by two proximal edges of the first wedged portion at the display panel side and two distal edges of the second wedged portion farthest away from the display panel side; and
wherein a combined area of the cross-section of the first wedged portion in a plane extended in the vertical direction and at area of the cross-section of the second wedged portion in a plane extended in the vertical direction is at least equal to one-third and no greater than two-thirds of an area of the cross-section of the bordering trapezoid in a plane extended in the vertical direction.

7. An image display device comprising:
a display panel; and
a light diffusion component to be disposed on a front surface of the display panel,
wherein the light diffusion component includes:
a transmission piece extending in a horizontal direction of the display panel, and having a substantially trapezoidal cross-section in a plane extended in a vertical direction of the display panel; and
a light absorption piece extending in the horizontal direction of the display panel, and having a substantially wedged cross-section in a plane extended in the vertical direction of the display panel, the substantially wedged cross-section becoming thinner in a direction of an image light from the display panel;
wherein the light transmission piece and the light absorption piece are alternated and adjacently juxtaposed in the vertical direction of the display panel; and
wherein defining that B1 denotes a length of a base of the substantially wedged cross-section of the light absorption piece at a side of the display panel and W1 denotes a length of a base of the trapezoidal cross-section of the light transmission piece at the display panel side, an aperture ratio provided as W1/(W1+B1) is equal to or larger than 10% and equal to or smaller than 40%.

8. The image display device according to claim 7, wherein the light absorption piece includes a first wedged portion located at the display panel side, and a second wedged portion joined to the first wedged portion, and
wherein a slope of the first wedged portion with respect to the image light direction is larger than a slope of the second wedged portion with respect to the image light direction.

* * * * *

UNITED STATES PATENT AND TRADEMARK OFFICE
CERTIFICATE OF CORRECTION

| | | |
|---|---|---|
| PATENT NO. | : 7,712,911 B2 | Page 1 of 1 |
| APPLICATION NO. | : 11/747413 | |
| DATED | : May 11, 2010 | |
| INVENTOR(S) | : Yatsu et al. | |

It is certified that error appears in the above-identified patent and that said Letters Patent is hereby corrected as shown below:

Title Page

Item (30) Foreign Application Priority Data should read

Nov. 27, 2006   (JP) ............ 2006-317954

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,712,911 B2 |
| APPLICATION NO. | : 11/747413 |
| DATED | : May 11, 2010 |
| INVENTOR(S) | : Yatsu et al. |

It is certified that error appears in the above-identified patent and that said Letters Patent is hereby corrected as shown below:

Title Page

Item (30)  Foreign Application Priority Data should read

Oct. 12, 2006   (JP) .............. 2006-278238

Signed and Sealed this
Twelfth Day of April, 2011

David J. Kappos
*Director of the United States Patent and Trademark Office*